US011516451B2

(12) United States Patent
Oba

(10) Patent No.: US 11,516,451 B2
(45) Date of Patent: Nov. 29, 2022

(54) IMAGING APPARATUS, IMAGING PROCESSING METHOD, IMAGE PROCESSING DEVICE AND IMAGING PROCESSING SYSTEM

(71) Applicant: Sony Corporation, Tokyo (JP)

(72) Inventor: Eiji Oba, Tokyo (JP)

(73) Assignee: Sony Group Corporation, Toyko (JP)

( * ) Notice: Subject to any disclaimer, the term of this patent is extended or adjusted under 35 U.S.C. 154(b) by 0 days.

(21) Appl. No.: 16/391,775

(22) Filed: Apr. 23, 2019

(65) Prior Publication Data

US 2019/0289272 A1 Sep. 19, 2019

Related U.S. Application Data

(63) Continuation of application No. 13/853,380, filed on Mar. 29, 2013, now Pat. No. 10,306,199.

(30) Foreign Application Priority Data

Apr. 25, 2012 (JP) .................. 2012-099505

(51) Int. Cl.
*H04N 11/00* (2006.01)
*H04N 9/74* (2006.01)
*H04N 9/77* (2006.01)
*G06T 1/20* (2006.01)

(52) U.S. Cl.
CPC .............. *H04N 11/00* (2013.01); *G06T 1/20* (2013.01); *H04N 9/74* (2013.01); *H04N 9/77* (2013.01)

(58) Field of Classification Search
CPC . H04N 11/00; H04N 9/77; H04N 9/74; G06T 1/20

USPC ......................................................... 348/148
See application file for complete search history.

(56) References Cited

U.S. PATENT DOCUMENTS

| 5,509,082 A | 4/1996 | Toyama et al. |
| 6,005,562 A * | 12/1999 | Shiga ................... H04N 7/0884 725/138 |
| 6,747,671 B1 * | 6/2004 | Saito ........................ G09G 1/04 345/698 |
| 7,698,450 B2 * | 4/2010 | Monroe ........... H04N 21/64322 709/218 |
| 2003/0125854 A1 * | 7/2003 | Kawasaki .............. G07C 5/008 701/431 |

(Continued)

FOREIGN PATENT DOCUMENTS

CN 101937558 A 1/2011
JP 2002-330428 A 11/2002

(Continued)

OTHER PUBLICATIONS

Japanese Office Action dated Nov. 10, 2015 for corresponding Japanese Application No. 2012-099505.

(Continued)

*Primary Examiner* — Zaihan Jiang
(74) *Attorney, Agent, or Firm* — Michael Best & Friedrich LLP

(57) ABSTRACT

An imaging apparatus includes: an image sensor; a signal processing unit repeatedly performing processing different from each other in a given number of sequential frames to imaging signals obtained by the image sensor to thereby obtain image data of respective frame; and an image data output unit sequentially outputting the image data of respective frames.

14 Claims, 14 Drawing Sheets

(56) References Cited

U.S. PATENT DOCUMENTS

| | | | |
|---|---|---|---|
| 2003/0221010 A1* | 11/2003 | Yoneya | G06F 16/58 |
| | | | 709/227 |
| 2004/0003409 A1 | 1/2004 | Berstis | |
| 2004/0051634 A1* | 3/2004 | Schofield | B60R 11/04 |
| | | | 348/E7.086 |
| 2005/0062854 A1 | 3/2005 | Shiraishi | |
| 2006/0044459 A1* | 3/2006 | Kato | H04N 5/2351 |
| | | | 348/E5.035 |
| 2006/0164514 A1 | 7/2006 | Muramatsu et al. | |
| 2006/0284994 A1 | 12/2006 | Kim | |
| 2007/0019072 A1* | 1/2007 | Bengtsson | B64D 11/0015 |
| | | | 348/148 |
| 2007/0030374 A1* | 2/2007 | Ishii | H04N 5/23293 |
| | | | 348/333.01 |
| 2007/0041444 A1* | 2/2007 | Gutierrez Novelo | |
| | | | H04N 19/593 |
| | | | 375/E7.199 |
| 2007/0047901 A1* | 3/2007 | Ando | H04N 9/8042 |
| 2007/0124060 A1 | 5/2007 | Shimizu et al. | |
| 2008/0062297 A1* | 3/2008 | Sako | G06F 3/011 |
| | | | 348/E5.022 |
| 2008/0074684 A1* | 3/2008 | Shiohara | H04N 1/2338 |
| | | | 358/1.6 |
| 2009/0027508 A1* | 1/2009 | Miki | H04N 5/23258 |
| | | | 348/208.99 |
| 2009/0078873 A1* | 3/2009 | Sakemoto | G01K 11/125 |
| | | | 250/339.11 |
| 2009/0086174 A1* | 4/2009 | Fukumoto | G03B 27/68 |
| | | | 355/29 |
| 2009/0097708 A1* | 4/2009 | Mizuta | G06T 3/4038 |
| | | | 382/104 |
| 2009/0115870 A1 | 5/2009 | Sasaki | |
| 2011/0298917 A1* | 12/2011 | Yanagita | H04N 13/139 |
| | | | 348/135 |
| 2012/0212579 A1* | 8/2012 | Frojdh | H04N 13/161 |
| | | | 348/43 |
| 2012/0281101 A1* | 11/2012 | Fujinawa | H04N 5/23245 |
| | | | 348/207.1 |
| 2013/0132140 A1 | 5/2013 | Amin et al. | |
| 2013/0148846 A1* | 6/2013 | Maeda | G06V 10/141 |
| | | | 382/103 |
| 2013/0156264 A1* | 6/2013 | Martensson | G06T 7/73 |
| | | | 382/103 |

FOREIGN PATENT DOCUMENTS

| | | |
|---|---|---|
| JP | 2006086823 A * | 9/2004 |
| JP | 2004-297405 A | 10/2004 |
| JP | 2005-269449 A | 9/2005 |
| JP | 2007-013777 A | 1/2007 |
| JP | 2007-325074 A | 12/2007 |
| JP | 2008-306496 A | 12/2008 |
| JP | 2011-044863 A | 3/2011 |

OTHER PUBLICATIONS

Japanese Office Action dated Jul. 5, 2016 for corresponding Japanese Application No. 2012-099505.
Chinese Office Action dated Jul. 13, 2017 for corresponding Chinese Application No. 201310135881.3.

* cited by examiner

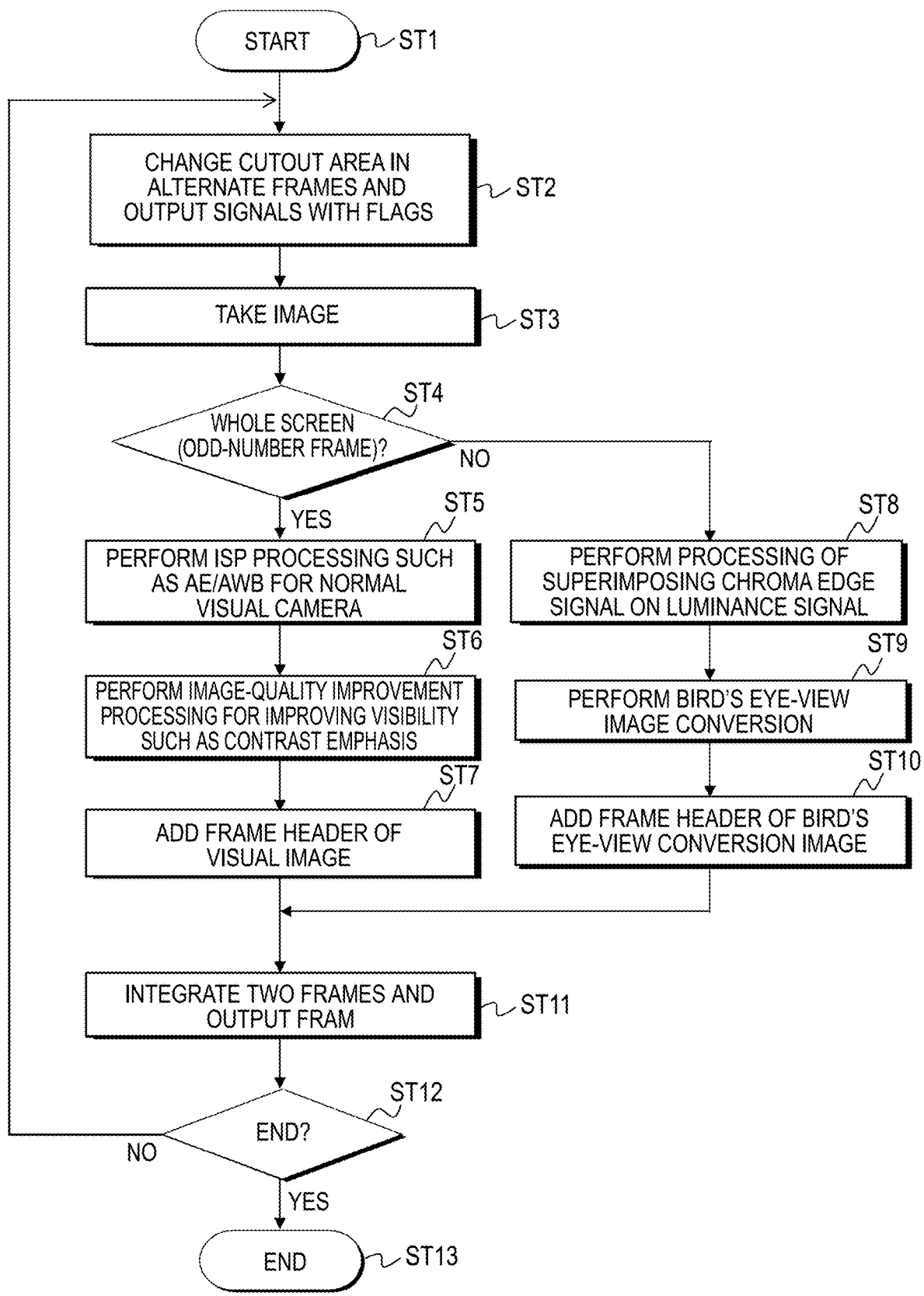

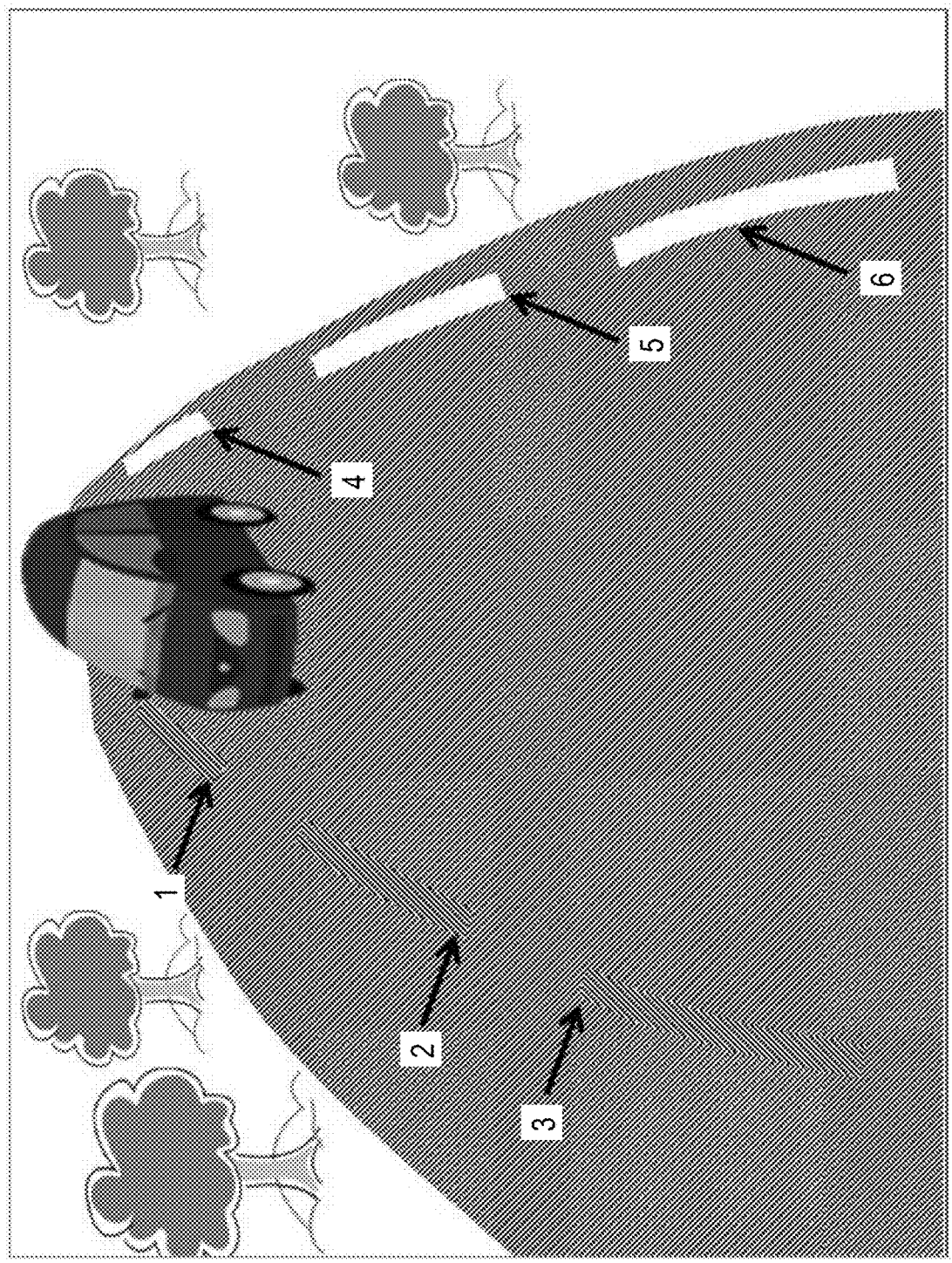

FIG.10C
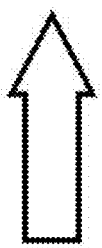
FIG.10A
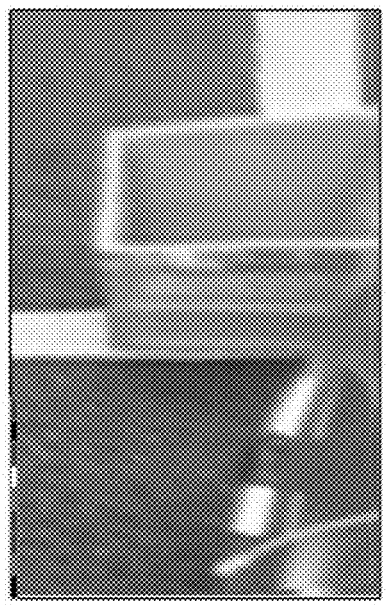
FIG.10B

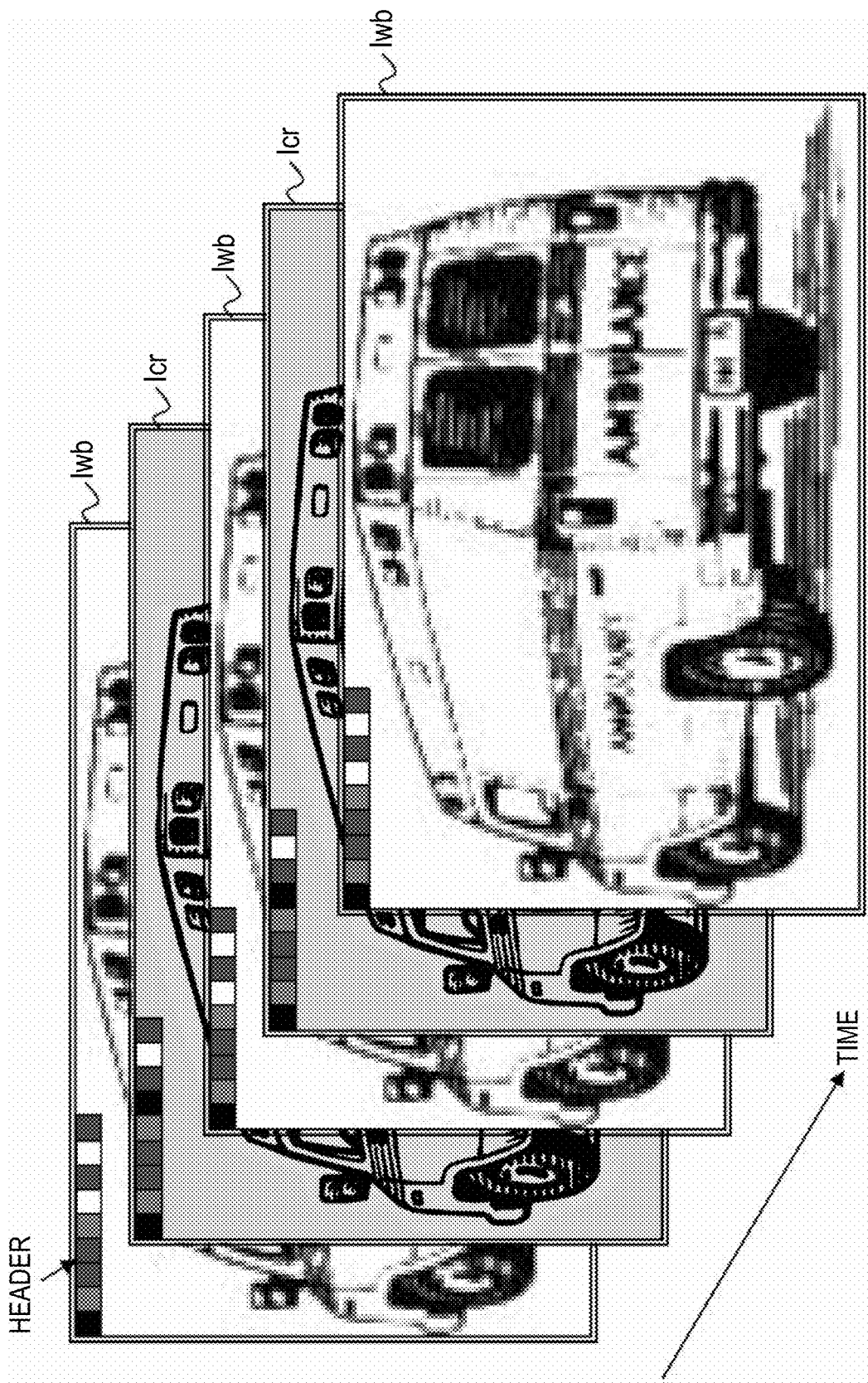

IMAGING APPARATUS, IMAGING PROCESSING METHOD, IMAGE PROCESSING DEVICE AND IMAGING PROCESSING SYSTEM

CROSS REFERENCES TO RELATED APPLICATIONS

This application is a Continuation Application of patent application Ser. No. 13/853,380, filed Mar. 29, 2013, which claims priority to Japanese Patent Application No.: 2012-099505, filed with Japan Patent Office on Apr. 25, 2012 and, the entire contents of which being incorporated herein by reference.

FIELD

The present disclosure relates to an imaging apparatus, an imaging processing method, an image processing device and an imaging processing system, and particularly relates to an imaging apparatus and so on suitable to be applied to an in-vehicle camera and the like.

BACKGROUND

An in-vehicle camera arranged at the back of a vehicle and the like to obtain a taken image of the vehicle periphery is known as related art (refer to JP-A-2002-330428 (Patent Document 1)). The in-vehicle camera outputs wide-angle image data corresponding to, for example, visual image data. To obtain particular image data such as bird's eye-view conversion image data and reduced-screen image data is performed by a camera ECU in a subsequent stage and so on, which increases the processing load of the camera ECU.

SUMMARY

It is desirable to facilitate processing of the camera ECU.

An embodiment of the present disclosure is directed to an imaging apparatus including an image sensor, a signal processing unit repeatedly performing processing different from each other in a given number of sequential frames to imaging signals obtained by the image sensor to thereby obtain image data of respective frames, and an image data output unit sequentially outputting the image data of respective frames.

In the embodiment of the present disclosure, imaging is performed by the image sensor to obtain imaging signals. The processing different from each other in the given number of sequential frames is repeatedly performed to the imaging signals by the signal processing unit to thereby obtain image data of respective frames. Then, image data of respective frames is outputted by the image data output unit.

It is possible, for example, that the signal processing unit obtains first frame image data by performing first processing in a first frame and obtains second frame image data by performing second processing in a second frame in sequential two frames of the imaging signals obtained by the image sensor. In this case, the first frame image data may be visual image data and the second frame image data may be image data to which bird's eye-view conversion is performed. Additionally, in this case, the image data to which the bird's eye-view conversion is performed may be image data obtained by superimposing a chroma edge signal on a luminance signal.

Furthermore, in this case, the first frame image data may be normal image data and the second frame image data may be image data obtained by superimposing a chroma edge signal on a luminance signal. Moreover, in this case, the first image data may be normal image data and the second image data may be sensor image data of an electronic shutter or data different in an exposure accumulation method. Also in this case, the first frame image data may be image data of a whole screen and the second image data is image data of a reduced screen. Also in this case, the first frame image data may be color image data and the second frame image data may be monochrome image data. The image data may also be obtained by performing processing at random to part of frames in sequential frames, not repeatedly performing processing alternately.

As described above, according to the embodiment of the present disclosure, frame image data obtained by performing a given number of, for example, two different processing can be sequentially outputted. Accordingly, the camera ECU in the subsequent stage can acquire these image data without performing processing of obtaining particular image data such as camera bird's eye-view conversion image data and reduced-screen image data. Accordingly, the processing load of the camera ECU can be reduced and the processing can be facilitated.

In the embodiment of the present disclosure, it is possible that, for example, the imaging apparatus further includes a header addition unit adding a header at least including identification information for identifying to which frame the image data corresponds in the given number of frames to image data of each frame obtained by the signal processing unit. As the header is added to image data of each frame as described above, for example, the camera ECU in the subsequent stage can determine information of the frame to be taken concerning what type of processing has been performed to image data of each frame accurately and easily at the time of starting processing of taking frames, therefore, the processing of taking frames can be appropriately performed selectively.

In this case, the header addition unit may add the header to an area outside an effective image area or an area inside the effective image area in each frame. As the header is added to the area inside the effective image area, for example, the header information can be adequately supplied to the camera ECU even in a case where the camera ECU in the subsequent stage takes only the effective image area. For example, the header addition unit may add the header by using part of bits in a given number of pixel data when adding the header in the area inside the effective image area in each frame. Accordingly, it is possible to suppress effects to image data due to the addition of the header to the area inside the effective image area.

Another embodiment of the present disclosure is directed to an imaging apparatus including an image sensor, and an information addition unit adding information of peculiar setting and processing to a header portion of a corresponding frame as identification determination information in accordance with signal processing of an imaging signal obtained by the image sensor.

Still another embodiment of the present disclosure is directed to a imaging apparatus including an image sensor, and an image processing unit, in which the image processing unit extracts a chroma edge signal with respect to part of a taken image obtained by the image sensor and superimposes the chroma edge signal on a luminance signal not having a luminance signal boundary in the same direction.

Yet another embodiment of the present disclosure is directed to an image processing device including an image data input unit inputting image data, in which the image data is obtained by repeatedly performing processing different from each other in a given number of sequential frames or at random, and a header at least including identification information for identifying to which frame the image data corresponds in the given number of frames is added to image data of each frame, and a processing unit appropriately performing processing of the inputted image data of each frame based on the added header.

Still yet another embodiment of the present disclosure is directed to an imaging processing system including an imaging apparatus, and an image processing device, in which the imaging apparatus includes an image sensor, a signal processing unit repeatedly performing processing different from each other in a given number of sequential frames to imaging signals obtained by the image sensor to thereby obtain image data of respective frames, a header addition unit adding a header at least including identification information for identifying to which frame the image data corresponds in the given number of frames to the image data of each frame, and an image data output unit outputting the image data of respective frames, and in which the image processing device includes an image data input unit inputting image data, and a processing unit appropriately performing processing of the inputted image data of each frame based on the added header.

In the embodiment of the present disclosure, the header may include at least one or more information of sensor electronic shutter, sensor amplifier gain and lens aperture information, lens filter information, temperature information, image differentiation component adjustment parameter values, image gray-scale adjustment parameters, image resolution adjustment parameters, processing between frames adjustment parameters, illumination estimation information, environment estimation information, camera AE adjustment information, camera WB adjustment information, image conversion presence information, image histogram information, image conversion setting information and image cutout coordinate information.

Further another embodiment of the present disclosure is directed to an imaging processing system having an imaging apparatus and an image processing device, including a means for outputting images in units of frames by the imaging apparatus, a means for adding a means for uniquely identifying the frame to a header of the image to be outputted, and a selection means for appropriately allocating the outputted images to unique memory addresses based on the image headers.

According to the embodiments of the present disclosure, it is possible to facilitate processing of the camera ECU.

BRIEF DESCRIPTION OF THE DRAWINGS

FIG. 4 is a flowchart showing an example of a processing procedure of an in-vehicle camera included in the imaging processing system;

FIG. 6 is an example of a frame image (before superimposition) for explaining processing of superimposing a chroma edge signal on a luminance signal;

FIGS. 10A to 10C are views showing an example of a picture-in-picture image in which a bird's eye-view conversion image near the back of a vehicle is inserted into a normal wide-angle image of the vehicle periphery;

FIG. 14 is a view showing an example in which frame image data of a color image and frame image data of a monochrome image are alternately outputted.

DETAILED DESCRIPTION

Hereinafter, a mode for carrying out the present disclosure (hereinafter referred to as an "embodiment") will be explained. The explanation will be made in the following order.

1. Embodiment
2. Modification Example

1. Embodiment

Configuration Example of Imaging Processing System

Figure 1:
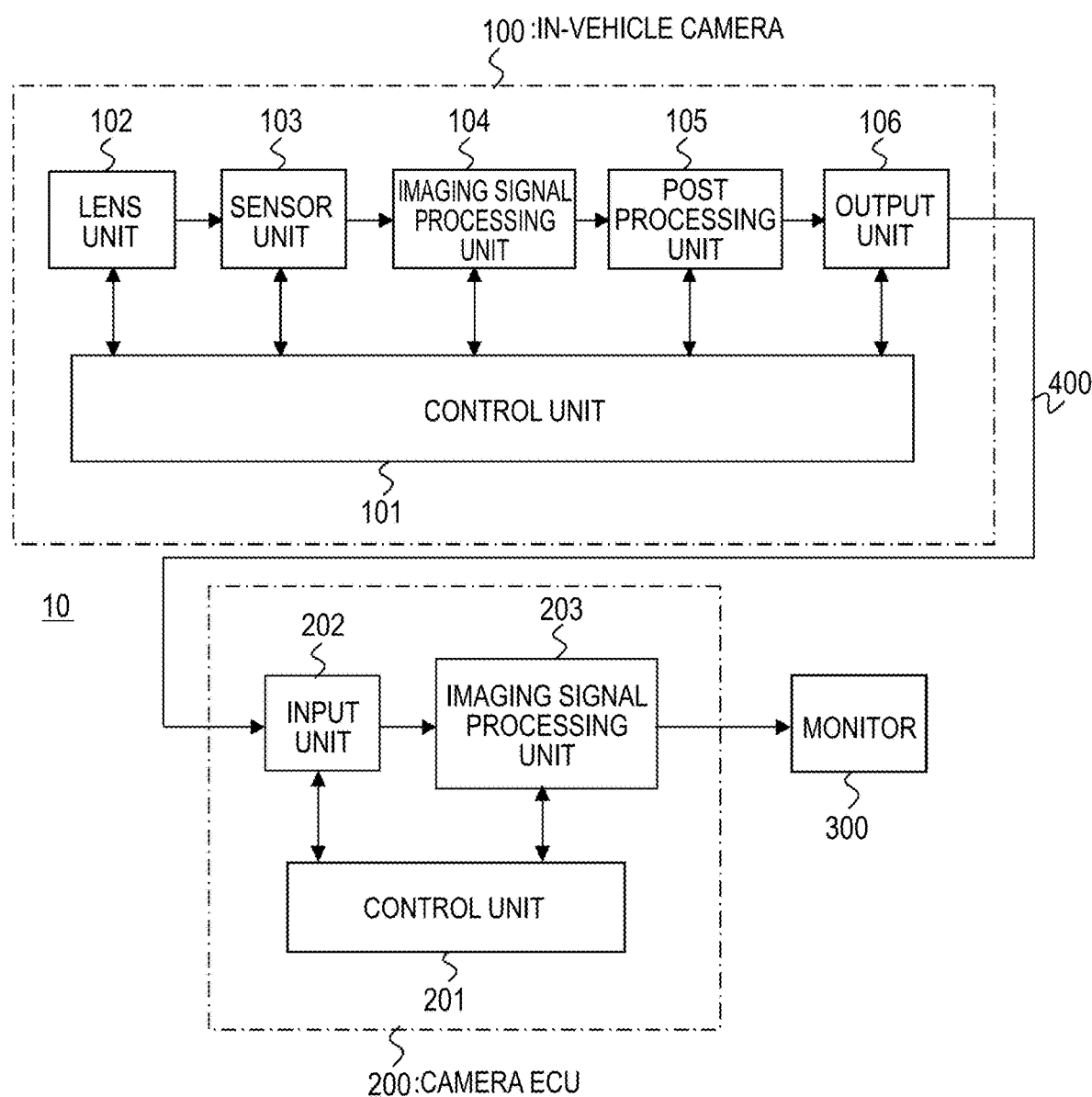
FIG. 1 is a block diagram showing a configuration example of an imaging processing system as an embodiment.

FIG. 1 shows a configuration example of an imaging processing system 10 as an embodiment. The imaging processing system 10 includes an in-vehicle camera 100 arranged at the back of a vehicle and the like and taking an image of the vehicle periphery, a camera ECU (electronic control unit) 200 having an image processing function and a monitor 300.

The in-vehicle camera 100 configures an imaging apparatus. The in-vehicle camera 100 includes a control unit 101, a lens unit 102, a sensor unit 103, an imaging signal processing unit 104, a post processing unit 105 and an output unit 106. The in-vehicle camera 100 and the camera ECU 200 are connected by a cable 400. The control unit 101 controls operations of respective units of the in-vehicle camera 100.

The lens unit 102 forms an object image on an imaging surface of the sensor unit 103. The sensor unit 103 obtains an imaging signal based on the object image formed on the imaging surface. The imaging signal processing unit 104 performs AE (Automatic Exposure) adjustment, AWB (Automatic White Balance) adjustment and so on to the imaging signal obtained by the sensor unit 103 to obtain taken image data. The post processing unit 105 performs various processing to the taken image data obtained in the imaging signal processing unit 104 to obtain image data to be transmitted to the camera ECU 200. The output unit 106 transmits the image data obtained in the post processing unit 105 to the cable 400.

The post processing unit 105 adds a header including setting (adjustment) information, environmental information and the like of respective units of the in-vehicle camera 100 to image data in each frame. Here, the environmental information is information of environmental light, environmental temperature and so on. In this case, the post processing unit 105 adds the header to either of an area outside an effective image area such as a blanking period or an area inside the effective image area. In the following description of the embodiment, the header is assumed to be added to the area inside the effective image area. As the header is added to the area inside the effective image area, header information can be appropriately supplied to the camera ECU 200 even when the camera ECU 200 in the subsequent stage takes only the area inside the effective image area.

Figure 2A:
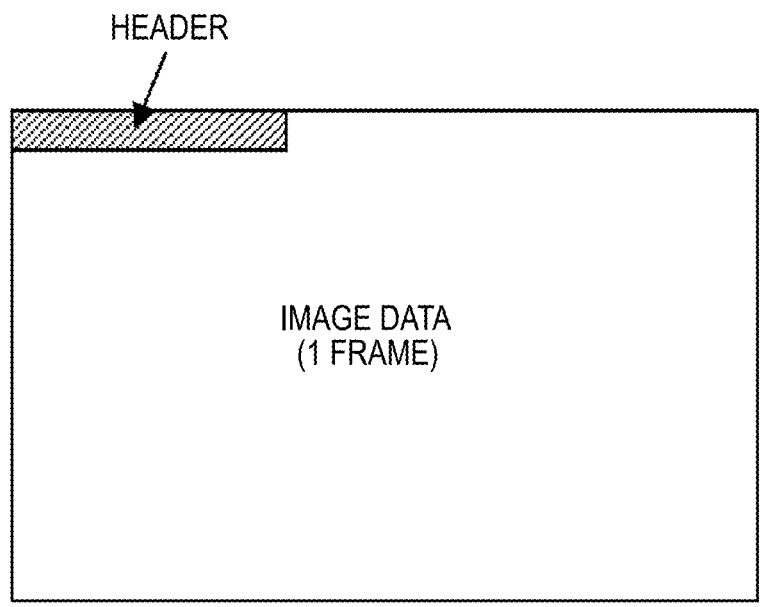
FIG. 2A is a view schematically showing a positional relationship between image data of one frame and a header to be added thereto.
Figure 2B:
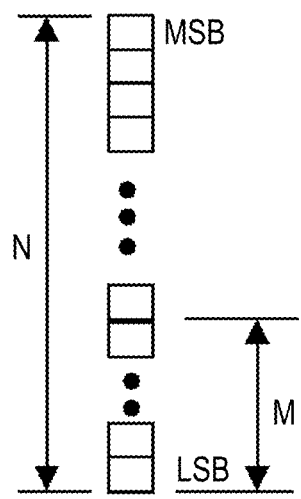
FIG. 2B is a view showing a configuration example of a pixel data portion to which the header is added.

FIG. 2A schematically shows a positional relationship between image data of one frame and the header to be added thereto. The header is added to the head of the image data. The drawing shows an example in which data is added to the front half of the first line. It is also preferable that data is added to the entire line, and further added to several lines. FIG. 2B shows a configuration example of a pixel data portion to which the header is added. As shown in the example, when pixel data is formed by N bits, for example, only low-order M bits may be allocated to the header. Accordingly, it is possible to suppress effects to image data due to the addition of header in the area inside the effective image area.

As described above, the header includes peculiar various setting (adjustment) information of respective units of the in-vehicle camera 100 in each frame. It is not necessary to include all the setting (adjustment) information and at least necessary information in the camera ECU 200 in the subsequent stage may be included. As setting (adjustment) information of the lens unit 102, for example, there are aperture setting information, filter setting information and so on.

As setting (adjustment) information of the sensor unit 103, for example, there are electronic shutter information, reading-operation setting information, addition setting information, amplifier gain setting information, filter arrangement information, sensitivity variation information, lens mount displacement information and so on. As setting (adjustment) information of the imaging signal processing unit 104, for example, there are AE adjustment information, AWB adjustment information, environment estimation information, output image size information, image cutout coordinate information, image conversion information, image right/left and up/down inversion information, image emphasis processing application value information, application noise reduction processing information, image histogram information and so on.

The post processing unit 105 also repeatedly performs processing different from each other in a given number of sequential frames to respective image data obtained in the imaging signal processing unit 104 to thereby obtain image data of respective frames to be transmitted. In the embodiment, first frame image data is obtained by performing first processing in the first frame, and second frame image data is obtained by performing second processing in the second frame in a sequential two frames.

The above-described header added to each frame also includes identification information for identifying to which frame the image data corresponds. The first processing and the second processing will be described later. The example in which processing is alternately performed to the images in the first frame and the second frame will be explained in the embodiment, however, the second processing may be performed at random to images continuously outputted from the camera, or different processing may be combined to be performed.

The camera ECU 200 includes a control unit 201, an input unit 202 and an image signal processing unit 203. The control unit 201 controls operations of respective units of the camera ECU 200. The input unit 202 takes image data transmitted from the in-vehicle camera 100 from the cable 400. The image signal processing unit 203 appropriately processes image data of each frame based on the header added to the image data to thereby obtain image data for display and so on. The image data for display is supplied to the monitor 300. A specific example of processing in the image signal processing unit 203 will be described later.

The operation of the imaging processing system 10 shown in FIG. 1 will be briefly explained. In the in-vehicle camera 100, an imaging signal obtained in the sensor unit 103 is supplied to the imaging signal processing unit 104. In the imaging signal processing unit 104, AE adjustment, AWB adjustment and so on are performed to the imaging signal to obtain taken image data. The taken image data is supplied to the post processing unit 105. In the post processing unit 105, various processing is performed to the taken image data to obtain image data to be transmitted to the camera ECU 200. The image data is transmitted from the output unit 106 to the cable 400.

Here, in the post processing unit 105, the header including setting (adjustment) information, environment information and the like of respective units of the in-vehicle camera 100 is added to the image data of each frame. Also in the post processing unit 105, the first processing is performed in the first frame in sequential two frames to obtain the first frame image data, and the second processing is performed in the second frame to obtain the second frame image data. The header added to each frame also includes identification information for identifying to which frame the image data corresponds. Though the example of two-frame alternate output is shown in the embodiment, output may be performed repeatedly in more number of frames. A configuration of performing sporadic and random peculiar processing may also be applied.

In the camera ECU 200, image data transmitted from the in-vehicle camera 100 is taken into the input unit 202 from the cable 400. The image data is supplied to the image signal processing unit 203. In the image signal processing unit 203, image data in each frame is appropriately processed through a selection circuit based on the header added to the image data even not through the control unit 201, thereby obtaining image data for display and the like. The image data for display is supplied to the monitor 300, and given image data is displayed on the monitor 300. In this case, image data of respective frames is appropriately allocated to unique memory addresses in accordance with the image headers and processed.

Specific Examples of Processing in In-Vehicle Camera and Camera ECU

Specific Example 1

Figure 3:
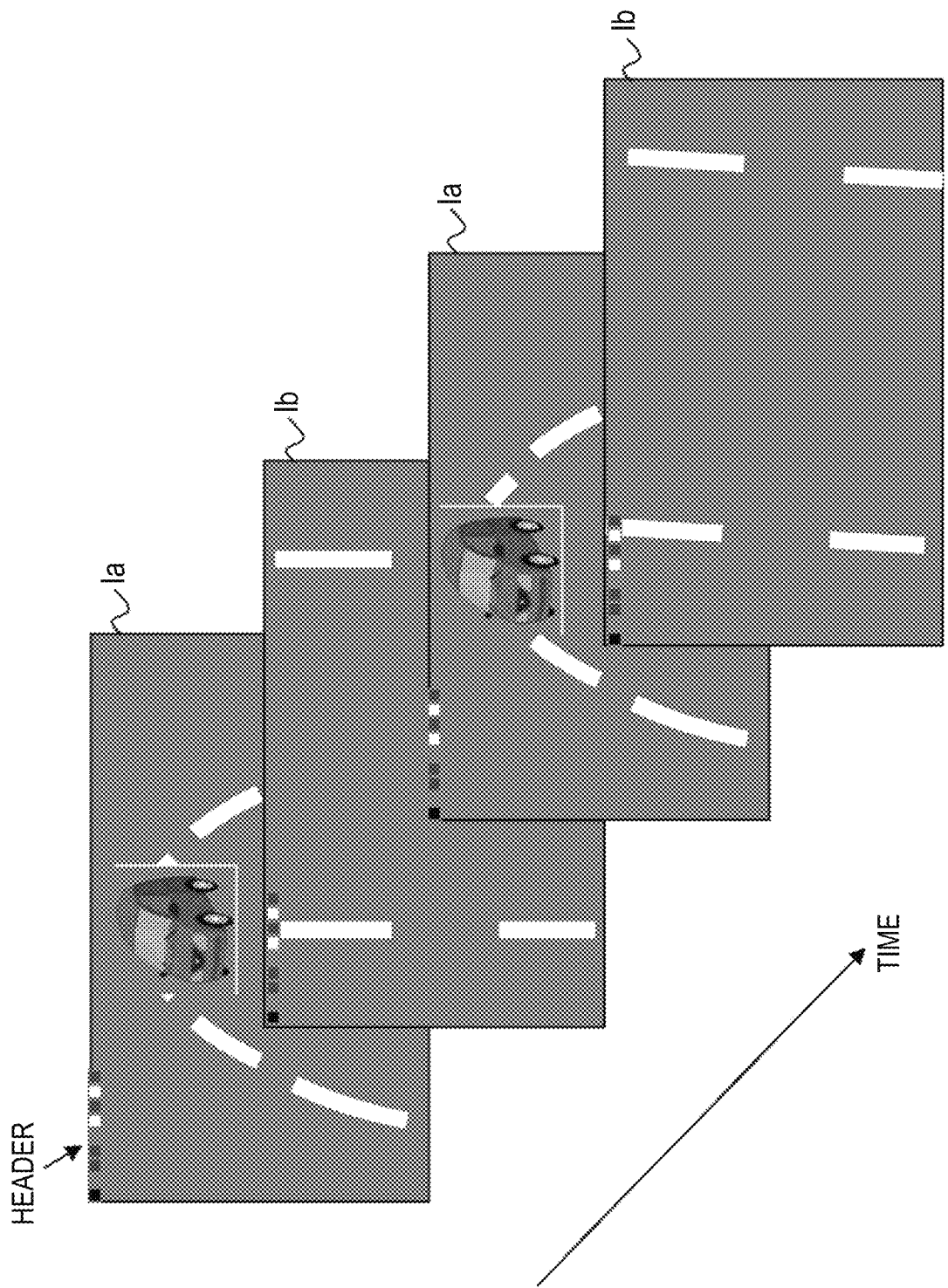
FIG. 3 is a view showing an example in which frame image data of a visual image (normal wide-angle camera image) and frame image data of a bird's eye-view conversion image are alternately outputted.

In this example, the in-vehicle camera 100 alternately outputs frame image data of a visual image (normal wide-angle camera image) 1a and frame image data of a bird's eye-view conversion image 1b as shown in FIG. 3.

Figure 5A:
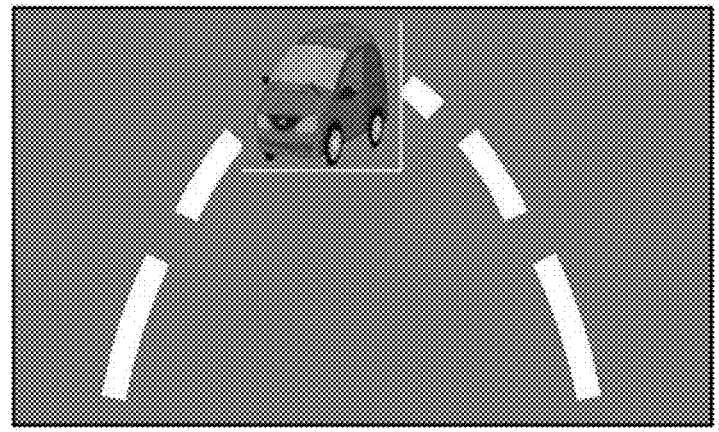
FIGS. 5A to 5C are views showing an example of obtaining image data of a bird's eye-view conversion image from image data of a road surface area as a part of a whole screen by performing bird's eye-view image conversion.
Figure 5B:
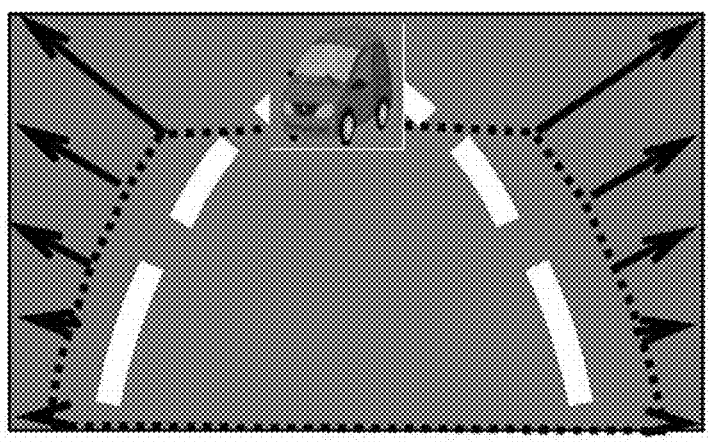

A flowchart of FIG. 4 shows an example of a processing procedure in the in-vehicle camera 100. The in-vehicle camera 100 starts processing in Step ST1. Next, in Step ST2, the sensor unit 103 changes a cutout area in alternate frames and outputs imaging signals with flags. For example, the cutout area in an odd-number frame is a whole screen and the cutout area in an even-number frame is a road surface area. For example, FIG. 5A shows an example of the whole screen and FIG. 5B in broken lines shows an example of the road surface area.

Next, in Step ST3, the imaging signal processing unit 104 takes the imaging signal from the sensor unit 103. The imaging signal processing unit 104 determines whether the frame is the odd-number frame in which the cutout area is the whole screen or the even-number frame in which the cutout area is the road surface area based on the added flag in Step ST4.

When the frame is the odd-number frame in which the cutout area is the whole screen, the imaging signal processing unit 104 performs ISP processing such as AE/AWB for the normal visual camera in Step ST5. Then, the post processing unit 105 performs image-quality improvement processing for improving visibility such as contrast emphasis in Step ST6. The post processing unit 105 also allows the header to include identification information indicating that the frame image data is a visual image in Step ST7.

When the frame is the even-number frame in which the cutout area is the road surface area in Step ST4, the imaging signal processing unit 104 performs given processing to the imaging signal taken from the sensor unit 103 and sends the signal to the post processing unit 105, and the post processing unit 105 performs processing of superimposing a chroma edge signal on a luminance signal.

As an effect of improving the accuracy with respect to the calculated amount performed in a color image is limited in many cases in image recognition processing, a detection method of using only the luminance signal is often used. However, in an application for recognizing white lines during driving, when yellow marks in a no-overtaking lane painted on a concrete road are represented in a gray-scale image, there arises a problem that luminance difference in concrete is small and thus it is difficult to recognize the marks as lane boundaries.

The post processing unit 105 extracts, for example, a differentiation change component of a color-difference signal which is a chroma signal from an image signal of a luminance color-difference signal and superimposes the signal on the luminance signal. Accordingly, it is possible to draw boundaries in the luminance signal and to realize processing of image recognition only based on analysis of the luminance signal.

Figure 7:
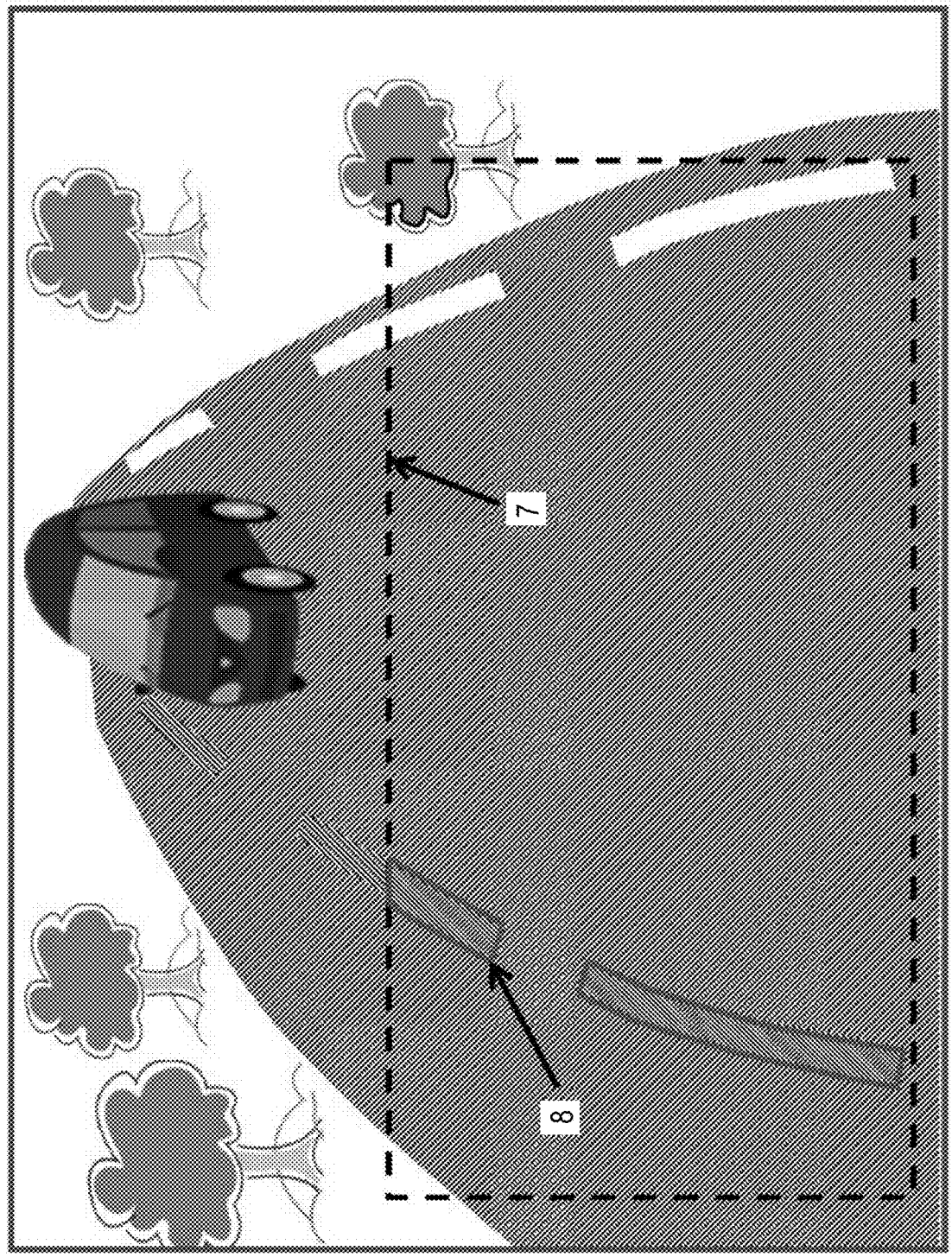
FIG. 7 is an example of a frame image (after superimposition) for explaining the processing of superimposing the chroma edge signal on the luminance signal in an image of a given area.

Here, the processing of superimposing the chroma edge signal on the luminance signal will be explained with reference to a frame image shown in FIG. 6. In the frame image, portions denoted by numerals 1, 2 and 3 indicate yellow marks in the no-overtaking lane painted on the concrete road. Portions denoted by numerals 4, 5 and 6 indicate white lines painted on the concrete road. The post processing unit 105 allows the chroma signal to transmit through a boundary detection filter only in an area used for recognition shown by being surrounded by a broken line in FIG. 7, and superimposes an output value on the luminance signal to perform output as denoted by a numeral 8. In this case, the chroma edge signal is extracted and is superimposed on the luminance signal not having a luminance signal boundary in the same direction.

Figure 5C:
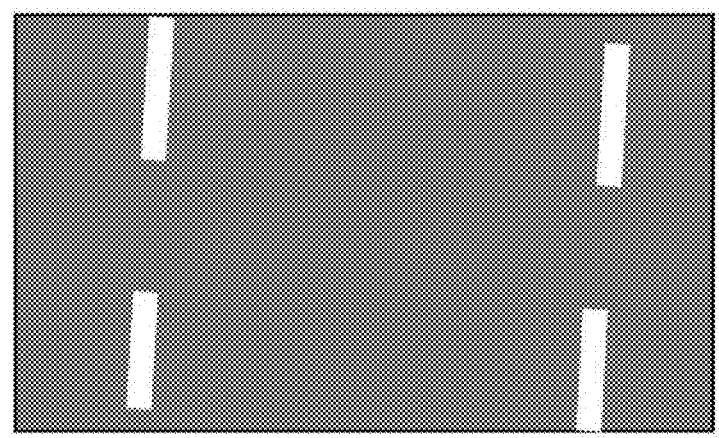

Return to FIG. 4, after performing processing of superimposing the chroma edge signal on the luminance signal in Step ST8, the post processing unit 105 performs bird's eye-view image conversion in Step ST9. In this case, the post processing unit 105 performs bird's eye-view image conversion of the image data in the road surface area shown in FIG. 5B to obtain image data of a bird's eye-view conversion image shown in FIG. 5C. The details of the method of generating the bird's eye-view conversion image are described in, for example, the transactions of the Institute of Electrical Engineers IP-08-21 IIS-08-46. Subsequently, the post processing unit 105 allows the header to include identification information indicating that the frame image data is the bird's eye-view conversion image in Step ST10. In this case, the header also includes area information of the area used for recognition, in which the chroma edge signal is superimposed on the luminance signal.

Next, in Step in ST11, the output unit 106 integrates two frames and outputs the frame to the cable 400. That is, when the frame is an odd-number frame, image data of the visual image obtained in the post processing unit 105 is outputted, and when the frame is an even-number frame, image data of the bird's eye-view conversion image obtained in the post processing unit 105 is outputted.

Next, the in-vehicle camera 100 determines whether the processing ends or not in Step ST12. When the processing does not end, the process returns to Step ST2 and the same process described above is repeated. When the processing ends, the processing is ended immediately in Step S13.

Figure 8:
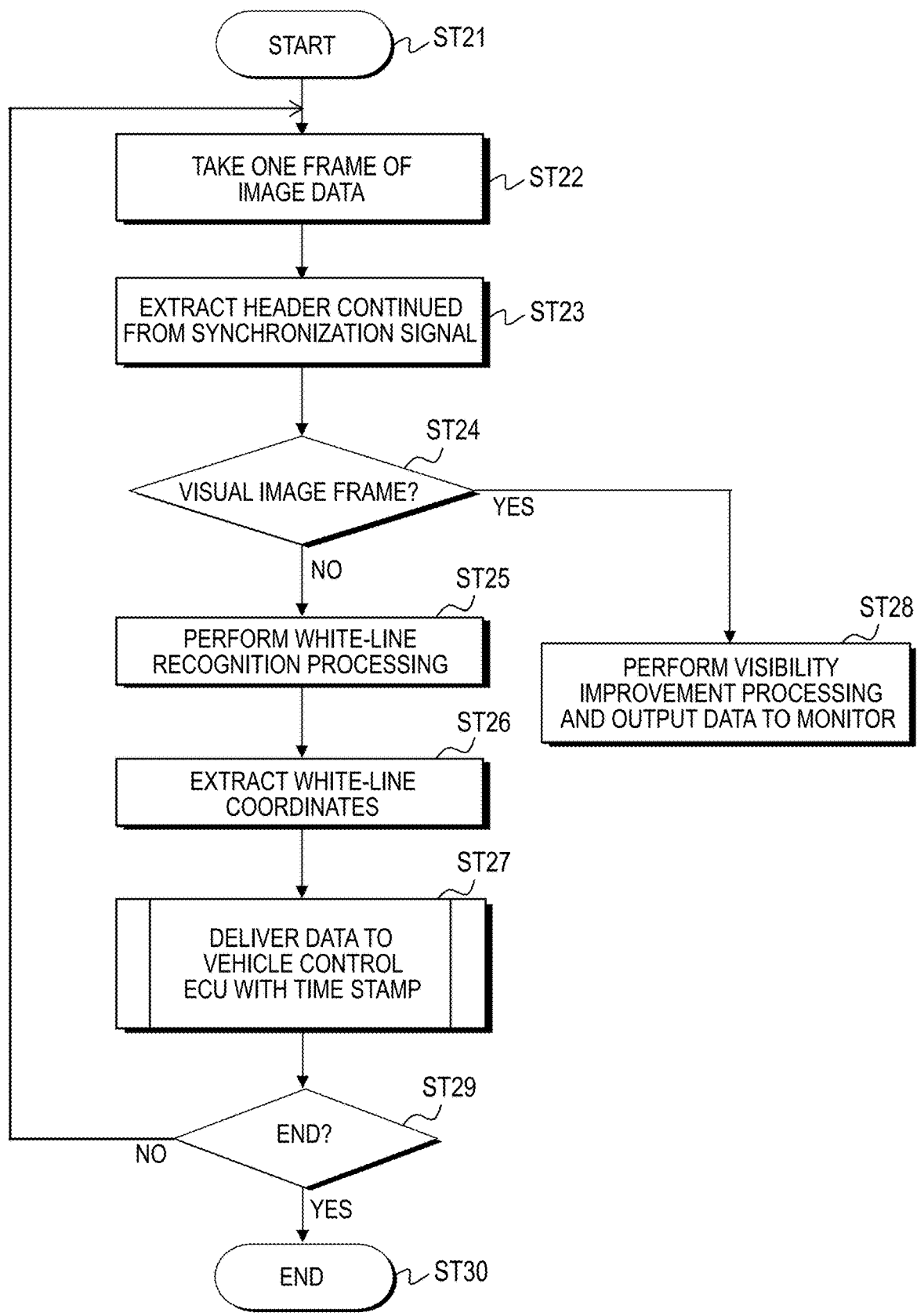
FIG. 8 is a flowchart showing an example of a processing procedure of a camera ECU included in the imaging processing system.

A flowchart of FIG. 8 shows an example of a processing procedure of the camera ECU 200. The flowchart shows the processing procedure with respect to one frame image data. The camera ECU 200 starts processing in Step ST21. Next, in Step ST22, the input unit 202 takes one frame of image data transmitted from the in-vehicle camera 100.

Next, in Step ST23, the image signal processing unit 203 extracts a header continued from a synchronization signal of the image data. Then, the image signal processing unit 203 determines whether the frame is the visual image frame or the bird's eye-view conversion image frame based on frame information included in the header in Step ST24.

When the frame is not the visual image frame, namely, the frame is the bird's eye-view conversion image frame, the image signal processing unit 203 appropriately performs white-line recognition processing with respect to image information including only a luminance value of the frame image data in Step ST25, and extracts white-line coordinates in Step ST26. Then, the image signal processing unit 203 delivers the extracted white-line coordinate data with a time stamp to a vehicle control ECU (not shown in FIG. 1) in Step ST27.

Here, the image signal processing unit 203 can estimate a white-line search area in advance and perform search processing suitable for recognizing nighttime/daytime and so on by using advance information such as recognition area information and environmental light included in the header, which can reduce searching time and improve the accuracy of searching.

Next, the camera ECU 200 determines whether the process ends or not in Step ST29. When the process does not end, the process returns to Step ST22 and proceeds with processing of next one frame. On the other hand, when it is determined that the process ends, the process is ended in Step ST30.

On the other hand, when the frame is the visual image frame, the image signal processing unit 203 performs visibility improvement processing such as contrast emphasis processing, edge emphasis processing to the frame image data and output the data to the monitor 300 in Step ST28. Accordingly, a normal wide-angle camera image of the vehicle periphery taken by the in-vehicle camera 100 is displayed on the monitor 300. For example, a monitor of a navigation system and so on is used also as the monitor 300, though not described above.

As described above, image data of an image for a visual purpose (visual image) and image data of an image for a white-line recognition purpose (bird's eye-view conversion image) are alternately outputted from the in-vehicle camera 100. Accordingly, it is possible to selectively perform the white-line recognition processing to the image data of the bird's eye-view conversion image without interposing the control unit 201 for determining switching of data in the camera ECU 200 in the subsequent stage, as a result, it is not necessary that the control unit 201 determines a destination of image processing and the processing load can be drastically reduced.

Figure 9:
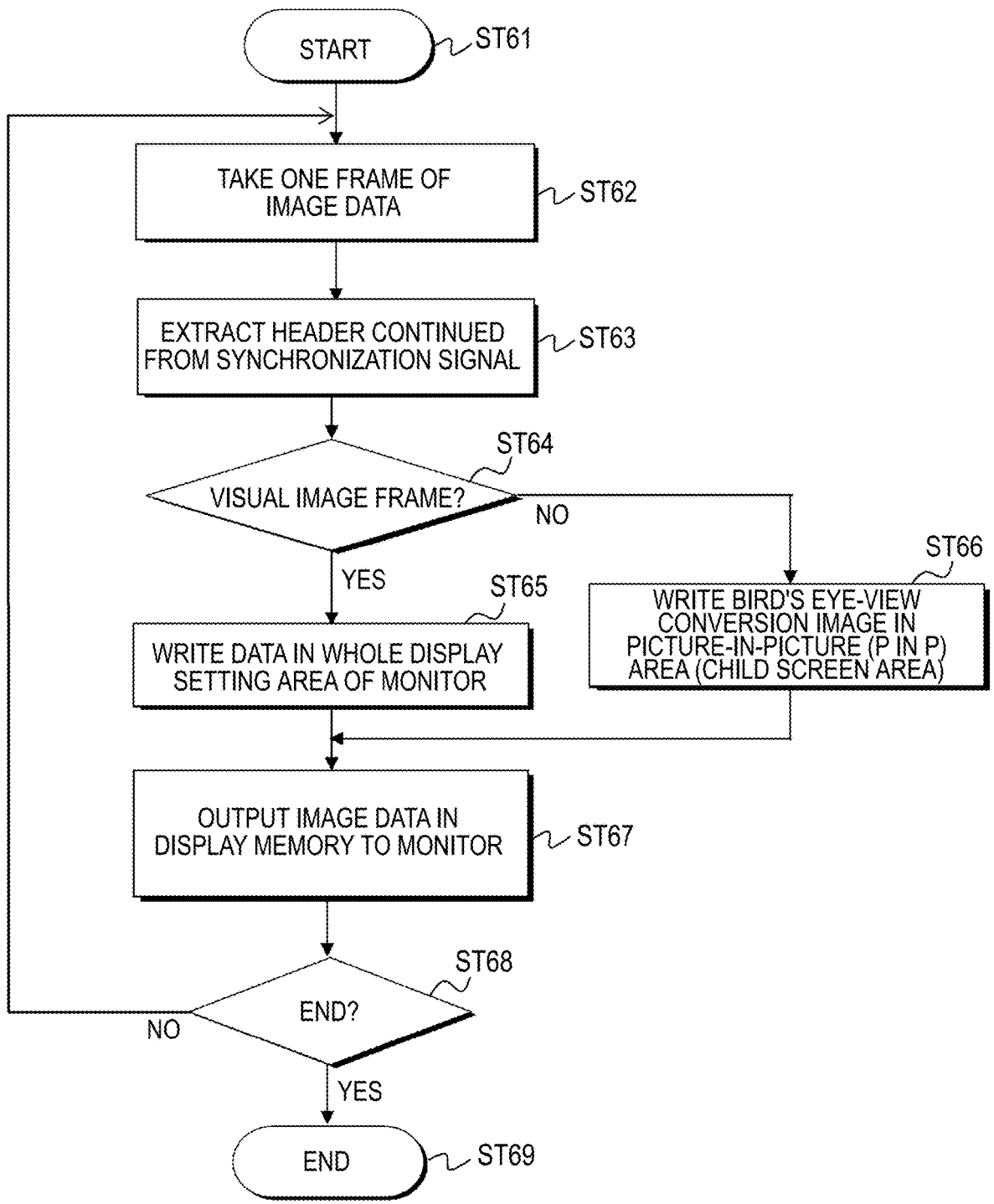
FIG. 9 is a flowchart showing another example of a processing procedure of the camera ECU included in the imaging processing system.

A flowchart of FIG. 9 shows an example of another processing procedure of the camera ECU 200. The flowchart shows the processing procedure with respect to one frame image data. The camera ECU 200 starts processing in Step ST61. Next, in Step ST62, the input unit 202 takes one frame of image data transmitted from the in-vehicle camera 100.

Next, in Step ST63, the image signal processing unit 203 extracts a header continued from a synchronization signal of the image data. Then, the image signal processing unit 203 determines whether the frame is the visual image frame or the bird's eye-view conversion image frame based on frame information included in the header in Step ST64.

When the frame is the visual image frame, the image signal processing unit 203 writes image data in a whole display setting area of the monitor (except a later-described P in P area) in a display memory in Step ST65. On the other hand, when the frame is the bird's eye-view conversion image frame, the image signal processing unit 203 writes image data of the bird's eye-view conversion image in a picture-in-picture (P in P) area in the display memory after performing down-scaling processing if necessary in Step ST66. Then, the image signal processing unit 203 outputs image data in the display memory to the monitor 300 in Step ST67.

Next, the camera ECU 200 determines whether the process ends or not in Step ST68. When the process does not end, the process returns to Step ST62, and proceeds with processing of next one frame. On the other hand, when it is determined that the process ends, the process is ended in Step ST69.

According to the processing of the flowchart of FIG. 9, a picture-in-picture image in which the bird's eye-view conversion image near the back of the vehicle is inserted into the normal wide-angle image of the vehicle periphery is displayed on the monitor 300. For example, when FIG. 10A is a normal wide-angle image and FIG. 10B is a bird's eye-view conversion image, a picture-in-picture image shown in FIG. 10C is displayed on the monitor 300.

As described above, image data of an image for the visual purpose (visual image) and image data of the image for the white-line recognition purpose (bird's eye-view conversion image) are alternately outputted from the in-vehicle camera 100, therefore, it is possible to display the picture-in-picture image using both image data in the camera ECU 200 in the subsequent stage.

Specific Example 2

Figure 11:
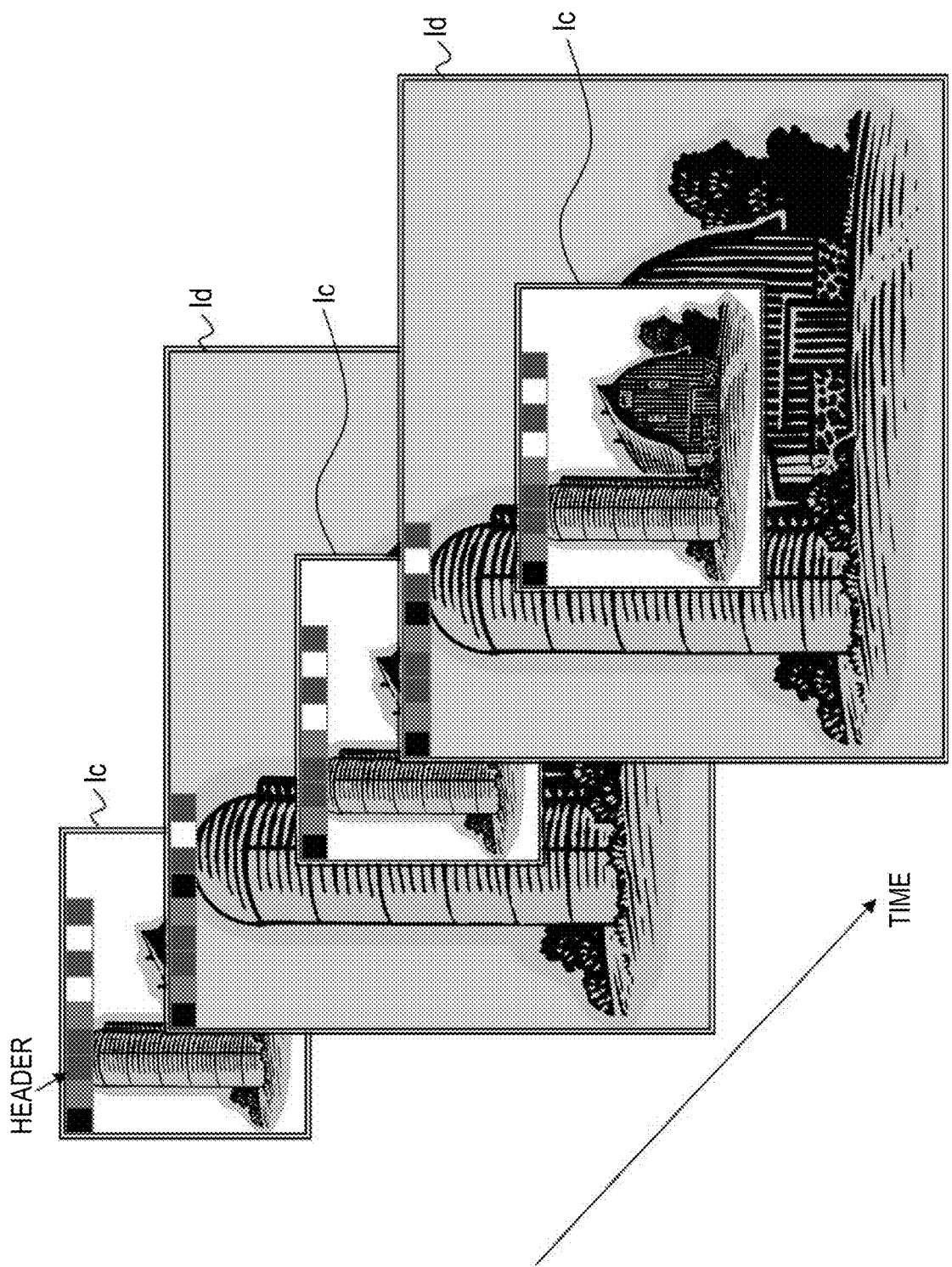
FIG. 11 is a view showing an example in which frame image data of a whole screen and frame image data of a reduced screen are alternately outputted.

In this example, the in-vehicle camera 100 alternately outputs frame image data of a whole screen 1d and frame image data of a reduced screen 1c as shown in FIG. 11. In the example, the frame image data of the reduced image 1c is a ¼ pixel-reduced screen obtained by performing neighboring pixel addition for giving priority to sensitivity.

Figure 12:
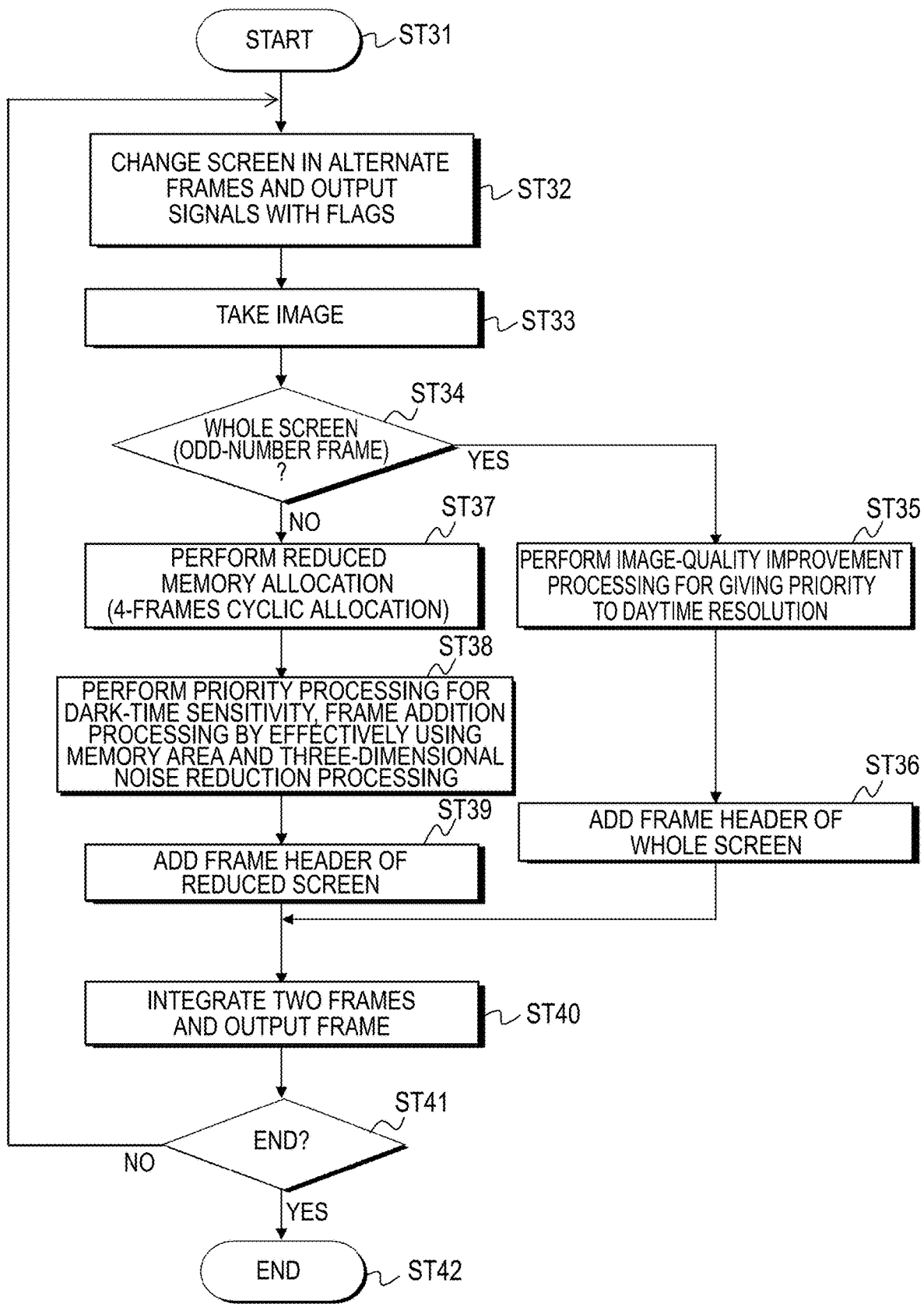
FIG. 12 is a flowchart showing another example of a processing procedure of the in-vehicle camera included in the imaging processing system.

A flowchart of FIG. 12 shows another example of a processing procedure of the in-vehicle camera 100. The in-vehicle camera 100 starts processing in Step ST31. Next, in Step ST32, the sensor unit 103 changes the screen to the whole screen or the reduced screen in alternate frames and outputs imaging signals with flags. For example, the odd-number frame is the whole screen and the even-number frame is the ¼ reduced screen.

Next, in Step ST33, the imaging signal processing unit 104 takes the imaging signal from the sensor unit 103. The imaging signal processing unit 104 determines whether the frame is the odd-number frame of the whole screen or the even-number frame of the ¼ reduced screen based on the added flag in Step ST34.

When the frame is the odd-number frame of the whole screen, the imaging signal processing unit 104 performs given processing to the imaging signal taken from the sensor unit 103 and outputs the signal to the post processing unit 105. The post processing unit 105 performs image-quality improvement processing for giving priority to daytime resolution in Step ST35. The post processing unit 105 also allows the header to include identification information indicating that the frame image data is the whole screen in Step ST36.

When the frame is determined to be the even-number frame of the ¼ reduced screen in Step ST34, the imaging signal processing unit 104 performs reduced memory allocation (4-frames cyclic allocation) in Step ST37. Then, the imaging signal processing unit 104 and the post processing unit 105 perform priority processing for dark-time sensitivity in Step ST38. For example, frame addition processing effectively using a memory area and three-dimensional noise reduction processing are performed.

Additionally, the post processing unit 105 allows the header to include identification information indicating that the frame image data is the ¼ reduced screen in Step ST39. In this case, the header is further allowed to include identification information indicating nighttime or daytime as environmental light information, frame counts and so on.

Next, in Step ST40, the output unit 106 integrates two frames and outputs the frame to the cable 400. That is, when the frame is an odd-number frame, image data of the whole screen obtained in the post processing unit 105 is outputted, and when the frame is an even-number frame, image data of the ¼ reduced screen obtained in the post processing unit 105 is outputted.

Next, the in-vehicle camera 100 determines whether the processing ends or not in Step S41. When the processing does not end, the process returns to Step ST32 and the same process described above is repeated. When the processing ends, the processing is ended immediately in Step S42.

Figure 13:
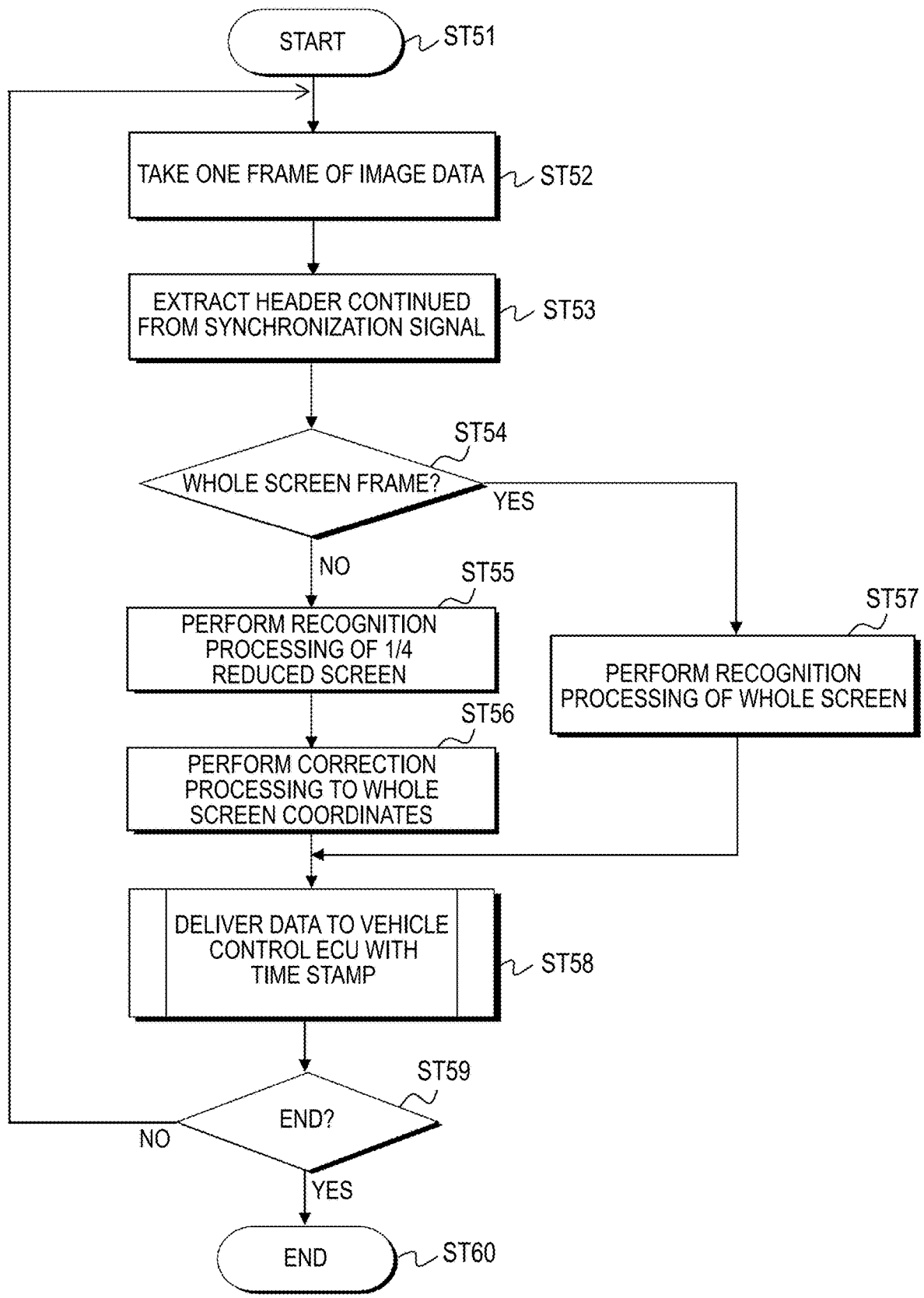
FIG. 13 is a flowchart showing another example of a processing procedure of the camera ECU included in the imaging processing system.

A flowchart of FIG. 13 shows another example of a processing procedure of the camera ECU 200. The flowchart shows the processing procedure with respect to one frame image data. The camera ECU 200 starts processing in Step ST51. Next, in Step ST52, the input unit 202 takes one frame of image data transmitted from the in-vehicle camera 100.

Next, in Step ST53, the image signal processing unit 203 extracts a header continued from a synchronization signal of the image data. Then, the image signal processing unit 203 determines whether the frame is the whole screen frame or the ¼ reduced screen frame based on frame information included in the header in Step ST54.

When the frame is not the whole screen frame, namely, the frame is the ¼ reduced screen frame, the image signal processing unit 203 performs image recognition processing based on image data of the ¼ reduced screen in Step ST55. In this case, an optimum detection filter is used depending on nighttime or daytime based on the environmental light information. Additionally, as frame addition and three-dimensional noise reduction processing are performed to the image data of the ¼ reduced screen as described above, the image signal processing unit 203 performs recognition processing for a low resolution image.

Next, the image signal processing unit 203 performs correction processing of coordinate information of the recognized image to whole screen coordinates in Step ST56. When the frame is the whole screen, the image signal processing unit 203 performs image recognition processing based on image data of the whole screen in Step ST57. Then, the image signal processing unit 203 delivers image recognition results obtained in Step ST56 and Step ST57, namely, coordinate information of the recognized image with a time stamp to the vehicle control ECU (not shown in FIG. 1) in Step ST58.

Next, the camera ECU 200 determines whether the process ends or not in Step ST59. When the process does not end, the process returns to Step ST52 and proceeds with processing of next one frame. On the other hand, when it is determined that the process ends, the process is ended in Step ST60.

As described above, image data of the whole screen and image data of the ¼ reduced screen are alternately outputted from the in-vehicle camera 100. Accordingly, the image recognition processing using both screens respectively can be appropriately performed in the camera ECU 200 in the subsequent stage, which can increase recognition accuracy. As the environmental light information is included in the header, parameters of the detection filter can be suitably adjusted depending on nighttime or daytime in the camera ECU 200, therefore, the recognition accuracy can be increased.

As described above, the in-vehicle camera 100 can sequentially output frame image data obtained by performing a given number of, for example, two different processing in the imaging processing system 10 shown in FIG. 1. Accordingly, for example, in the camera ECU 200 in the subsequent stage, these image data can be acquired without performing processing of obtaining particular image data such as the camera bird's eye-view conversion image data and the reduced screen image data. Therefore, the processing load of the camera ECU can be reduced and the processing can be facilitated.

Also in the imaging processing system 10 shown in FIG. 1, the header at least including identification information for identifying to which frame the image data corresponds in the given number of frames to image data of each frame outputted from the in-vehicle camera 100. Accordingly, the camera ECU 200 in the subsequent stage can determine what type of processing has been performed to image data of each frame accurately and easily, therefore, adequate processing can be performed.

Also in the imaging processing system 10 shown in FIG. 1, the header added to image data of each frame outputted from the in-vehicle camera 100 also includes environmental light information and so on, the optimum processing can be selectively performed also by using the information in the camera ECU 200 in the subsequent stage.

2. Modification Example

In the above embodiment, the example in which frame image data of the visual image (normal wide-angle camera image) and frame image data of the bird's eye-view conversion image are alternately outputted from the in-vehicle camera 100 and the example in which frame image data of the whole screen and the frame image data of the reduced screen are alternately outputted are shown. However, the present disclosure is not limited to the above and it is also preferable that frame image data to which other different processing is performed is alternately or irregularly outputted. For example, an example in which frame image data of a color image Icr and frame image data of a monochrome image Iwb are alternately outputted as shown in FIG. 14 can be considered.

The present disclosure may be configured as follows.

(1) An imaging apparatus including
an image sensor,
a signal processing unit repeatedly performing processing different from each other in a given number of sequential frames to imaging signals obtained by the image sensor to thereby obtain image data of respective frames, and
an image data output unit sequentially outputting the image data of respective frames.

(2) The imaging apparatus described in the above (1), further including
a header addition unit adding a header at least including identification information for identifying to which frame the image data corresponds in the given number of frames to image data of each frame obtained by the signal processing unit.

(3) The imaging apparatus described in the above (2),
in which the header addition unit adds the header to an area outside an effective image area or an area inside the effective image area in each frame.

(4) The imaging apparatus described in the above (3),
in which the header addition unit adds the header by using part of bits in a given number of pixel data when adding the header in the area inside the effective image area in each frame.

(5) The imaging apparatus described in any of the above (1) to (4),
in which the signal processing unit obtains first frame image data by performing first processing in a first frame and obtains second frame image data by performing second processing in a second frame in sequential two frames of the imaging signals obtained by the image sensor.

(6) The imaging apparatus described in the above (5),
in which the first frame image data is visual image data and the second frame image data is image data to which image conversion is performed.

(7) The imaging apparatus described in the above (6),
in which the second frame image data is image data to which bird's eye-view conversion is performed.

(8) The imaging apparatus described in the above (6),
in which the image data to which the bird's eye-view conversion is performed is image data obtained by superimposing a chroma edge signal on a luminance signal.

(9) The imaging apparatus described in the above (5),
in which the first frame image data is normal image data and the second frame image data is image data obtained by superimposing a chroma edge signal on a luminance signal.

(10) The imaging apparatus described in the above (5),
in which the first frame image data is image data of a whole screen and the second frame image data is image data of a reduced screen.

(11) The imaging apparatus described in the above (5),
in which the first frame image data is color image data and the second frame image data is monochrome image data.

(12) An imaging processing method including
obtaining imaging signals by an image sensor,
repeatedly performing processing different from each other in a given number of sequential frames to the imaging signals to thereby obtain image data of respective frames, and
sequentially outputting the obtained image data of respective frames.

(13) The imaging processing method described in the above (12),
in which an object is imaged with illumination intensity in a wide range by performing exposure processing different according to the frame in the process of obtaining the imaging signals by the image sensor.

(14) An imaging apparatus including
an image sensor, and
an information addition unit adding information of peculiar setting and processing to a header portion of a corresponding frame as identification determination information in accordance with signal processing of an imaging signal obtained by the image sensor.

(15) An imaging apparatus including
an image sensor, and
an image processing unit,
in which the image processing unit extracts a chroma edge signal with respect to part of a taken image obtained by the image sensor and superimposes the chroma edge signal on a luminance signal not having a luminance signal boundary in the same direction.

(16) An image processing device including
an image data input unit inputting image data, in which the image data is obtained by repeatedly performing processing different from each other in a given number of sequential frames, and a header at least including identification information for identifying to which frame the image data corresponds in the given number of frames is added to image data of each frame, and
a processing unit appropriately performing processing of the inputted image data of each frame based on the added header.

(17) An imaging processing system including
an imaging apparatus, and
an image processing device,
in which the imaging apparatus includes
an image sensor,
a signal processing unit repeatedly performing processing different from each other in a given number of sequential frames to imaging signals obtained by the image sensor to thereby obtain image data of respective frames,
a header addition unit adding a header at least including identification information for identifying to which frame the image data corresponds in the given number of frames to the image data of each frame, and
an image data output unit outputting the image data of respective frames, and
in which the image processing device includes
an image data input unit inputting image data, and
a processing unit appropriately performing processing of the inputted image data of each frame based on the added header.

(18) The imaging processing system described in the above (17),
in which the header includes at least one or more information of sensor electronic shutter, sensor amplifier gain and lens aperture information, lens filter information, temperature information, image differentiation component adjustment parameter values, image gray-scale adjustment parameters, image resolution adjustment parameters, processing between frames adjustment parameters, illumination estimation information, environment estimation information, camera AE adjustment information, camera WB adjustment information, image conversion presence information, image histogram information, image conversion setting information and image cutout coordinate information.

(19) An imaging processing system having an imaging apparatus and an image processing device, including
a means for outputting images in units of frames by the imaging apparatus,
a means for adding a means for uniquely identifying the frame to a header of the image to be outputted, and
a selection means for appropriately allocating the outputted images to unique memory addresses based on the image headers.

The present disclosure contains subject matter related to that disclosed in Japanese Priority Patent Application JP 2012-099505 filed in the Japan Patent Office on Apr. 25, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sensor apparatus comprising:
a processing unit that is electrically connectable, via wiring, to an electronic control unit; and
an output unit configured to output, to the electronic control unit when the processing unit adds a header to image data, the image data that includes the header,
wherein the processing unit is configured to:
receive, from a sensor unit, sequential frames of image data obtained by the sensor unit,
perform, when the processing unit determines that a first one of the sequential frames is from a first category of frames, first processing on the first one of the sequential frames,
perform, when the processing unit determines that a second one of the sequential frames is from a second category of frames that differ from the first category of frames, second processing on the second one of the sequential frames,
identify, in the second one of the sequential frames when the processing unit performs the second processing, a cutout area of the second one of the sequential frames, and add, to the second one of the sequential frames when the processing unit identifies the cutout area, the header that includes coordinate information for the cutout area.

2. The sensor apparatus according to claim 1, wherein the header includes setting information.

3. The sensor apparatus according to claim 1, wherein the header comprises environmental information.

4. The sensor apparatus according to claim 1, wherein the header comprises identification information.

5. The sensor apparatus according to claim 1, wherein the electronic control unit is configured to convert, when the electronic control unit processes the header, the image data into displayable image data.

6. The sensor apparatus according to claim 1, wherein the wiring is a cable.

7. The sensor apparatus according to claim 1, wherein the sensor unit is a camera.

8. The sensor apparatus according to claim 1, wherein the sensor apparatus is configured to be mounted within a vehicle.

9. The sensor apparatus according to claim 8, wherein the image data is information that pertains to a periphery of the vehicle.

10. The sensor apparatus according to claim 5, wherein the processing unit is configured to supply the displayable image data to a monitor.

11. The sensor apparatus according to claim 1, wherein the second processing comprises cutout processing.

12. The sensor apparatus according to claim 1, wherein a field of view of an image after the first processing differs from a field of view of an image after the second processing.

13. The sensor apparatus according to claim 1, wherein the first category is one of an odd-number frame and an even-number frame.

14. The sensor apparatus according to claim 13, wherein the second category is another of the odd-number frame and the even-number frame.

\* \* \* \* \*